Patented Mar. 3, 1931

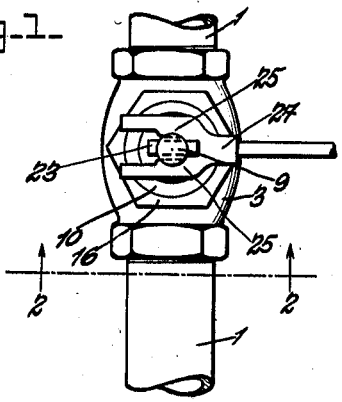
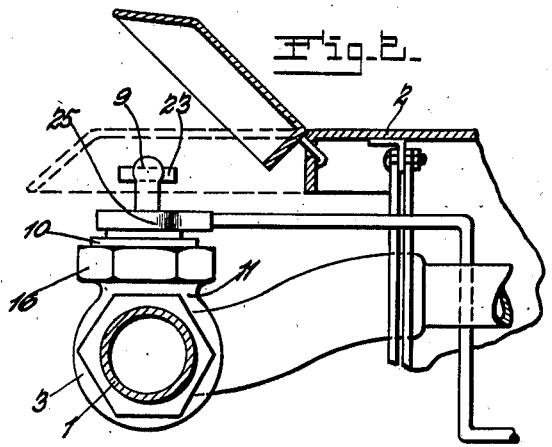
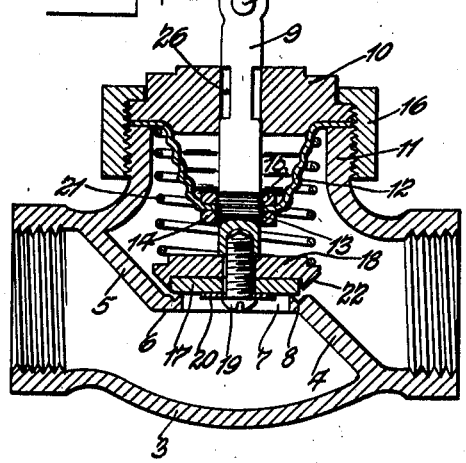

1,794,703

UNITED STATES PATENT OFFICE

CARL E. METHUDY, OF ST. LOUIS, MISSOURI, ASSIGNOR TO METHUDY AUTOMATIC LIGHTER CO., OF EAST ST. LOUIS, ILLINOIS, A CORPORATION OF ILLINOIS

VALVE

Application filed May 22, 1929. Serial No. 364,968.

This invention relates to valves, and an object is to provide a valve mounted for perpendicular movements from and to closed position upon the valves stem in a pipe, in combination with means for closing the valve, and an improved device in the form of a diaphragm through which the valve stem extends and having its central portion hermetically attached to the valve stem and its outer marginal portion hermetically attached to the pipe so as to provide an impervious seal preventing leakage of fluid or gas or vapor through any of the joints of the valve mounting.

The device is specially designed and adapted for use in gas pipes, though it is clear enough that the invention may be used with equal advantage in steam or fluid conduits.

Other objects will appear from the following description, reference being made to the accompanying drawing in which Fig. 1 is a plan view of a valve housing and attached fittings having my improved valve embodied therein.

Fig. 2 is a sectional view on the line 2—2 of Fig. 1 showing the portion of the burner box frame of a gas stove and the gas pipe in which the invention is mounted.

Fig. 3 is an enlarged longitudinal vertical sectional view showing details of the invention.

The invention is shown as mounted in a gas pipe 1 for conducting gas to the manifold of a gas stove having a burner box frame 2.

The device comprises a valve housing 3 forming a connection between sections of the pipe 1 and having therein a partition comprising a lower inclined wall 4, an upper inclined wall 5, and a horizontal wall 6 integrally connecting the upper and lower portion of the walls 4 and 5 respectively. The walls 4 and 5 are imperforate and are integrally united throughout their length and width with the walls of the housing 3.

The wall 6 is formed with a valve opening or port 7. The upper side of the wall 6 around the opening or port 7 is formed with a groove 8, the inner wall of which inclines upwardly to sharp intersection with the vertical wall of the valve opening or port 7 so as to provide a sharp valve seat.

The valve comprises a stem 9 extending through and mounted for longitudinal sliding movements in a cap 10. The valve housing 3 is formed with a laterally extended tubular portion 11 which is concentric with the axis of the valve opening or port 7 and which is exteriorly threaded. A diaphragm or seal 12 of flexible and pliable material such as leather or any other material or substance that will serve as an equivalent in this embodiment is cup-shaped and has a central hole through the bottom thereof through which the stem 9 extends. The valve stem 9 is formed with a threaded portion 13 on which an inner clamping nut 14 and an outer clamping nut 15 are screwed in a relationship to engage and clamp tightly and hermetically between them the inner marginal portion of the diaphragm 12 around the hole through which the valve stem extends. The outer marginal portion of the diaphragm 12 is seated on the end of the tubular extension 11 and is clampingly engaged by by the cap 10. A ring nut 16 is screwed on the tubular extension 11 and engages the marginal portion of the cap 10 and clamps said cap tightly and imperviously upon the marginal portion of the diaphragm 12. Thus, the stem 9 is longitudinally movable through the cap 10 without substantial hindrance by the diaphragm 12. There is an impervious joint between the diaphragm 12 and said stem and also an impervious joint between said diaphragm and the tubular extension 11. Accordingly, the device is leak-proof.

The valve comprises a disc 17 of appropriate material design and arranged to seat upon the sharp valve seat formed by the intersection of the inclined wall of the groove 8 with the vertical wall of the opening or port 7 so as to provide an impervious closure. A metallic disc 18 is recessed in its under side to receive the member 17 and said member 17 and disc 18 are attached to the inner end of the valve stem 9 by a screw 19 passing through holes in said member 17 and said disc 18 and being screwed into the inner end of said stem 9. A gasket washer 20 through which the screw 19 passes functions to prevent leakage along the screw and through the valve.

A spring 21 encircles the cup diaphragm 12 and has its outer end bearing against the marginal portion of the diaphragm and its inner end seating upon a circumferential ledge 22 around the disc 18 and thereby held from lateral displacement. The power and tension of this spring 21 is utilized to actuate the valve to closed position and to hold the valve in closed position with sufficient pressure to prevent the valve from yielding or opening under pressure of the fluid or gas or vapor. The valve stem 9 is shown as equipped with a handle 23 for manual engagement in opening the valve.

I have shown herein a latch device comprising a body 24 having two arms 25 projecting therefrom and spaced apart a distance less than the diameter of the stem 9. In order to receive the arms 25 the stem 9 is formed with diametrically opposite notches 26, the inner walls of which are about the same distance apart as the distance between the arms 25 so as to permit said arms to be moved into and out of said notches. In closed position of the valve the notches 26 are within the cap 10 (Fig. 3). When the valve stem 9 is moved outwardly to open the valve, the arms 9 may enter the notches 26 and thereby hold the valve open in opposition to the power and tension of the spring 21. To permit the valve to close it is only necessary to move the latch device a distance sufficient to disengage the arms 25 from the notches 26.

I am aware that the construction and arrangement may be varied within equivalent limits without departure from the nature and principle of the invention. I do not restrict myself in unessential respects, but what I claim and desire to secure by Letters Patent is:—

1. A valve comprising a housing, a partition in said housing including a portion parallel with the axis of the housing and having an opening therethrough, a valve seat around said opening, a valve stem mounted for non-rotative radial movements in said housing, a valve attached to the inner end of said valve stem and movable thereby to and from position upon said valve seat, a spring enclosed in said housing actuating said valve toward said valve seat, a non-metallic diaphragm through which said valve stem extends, means connecting the inner portion of said diaphragm hermetically with said valve stem, and means attaching the outer marginal portion of said diaphragm hermetically to said housing.

2. A valve comprising a housing, a partition in said housing including a portion parallel with the axis of the housing and having an opening therethrough, a valve seat around said opening, a valve stem mounted for radial movements in said housing, a valve attached to the inner end of said valve stem and movable thereby to and from position upon said valve seat, a non-metallic diaphragm through which said valve stem extends, means connecting the inner portion of said diaphragm hermetically with said valve stem, means attaching the outer marginal portion of said diaphragm hermetically to said housing, and a spring having its outer end abutting against the outer marginal portion of said diaphragm and having its inner end abutting against said valve and operating to actuate said valve to closed position.

3. A valve comprising a housing, a partition in said housing including a portion parallel with the axis of the housing and having an opening therethrough, a valve seat around said opening, a valve stem mounted for radial movements in said housing, a valve attached to the inner end of said valve stem and movable thereby to and from position upon said valve seat, a non-metallic diaphragm through which said valve stem extends, means connecting the inner portion of said diaphragm hermetically with said valve stem, means attaching the outer marginal portion of said diaphragm hermetically to said housing, a spring having its outer end abutting against the outer marginal portion of said diaphragm and having its inner end abutting against said valve and operating to actuate said valve to closed position, and a device attached centrally to one side of and preventing leakage through said valve.

4. A valve comprising a valve housing, a partition wall in said housing including a portion parallel with the axis of said housing and having an opening therethrough, a tubular portion extending laterally from said housing and having its axis in alinement with the axis of said opening, a non-metallic flexible diaphragm having its marginal portion seated on the end of said tubular extension, a cap clamped upon said marginal portion of said diaphragm, a valve stem extending for sliding movements through said cap and also extending through the center of said diaphragm, clamping members engaging the central portion of said diaphragm between them and forming an hermetic joint with said stem, a valve disc against the inner end of said stem, a valve member against the inner side of said disc, an element passing through said valve member and said valve disc and securing said parts to said valve stem, and means preventing leakage through said valve member and said valve disc around said element.

CARL E. METHUDY.